(12) United States Patent
Khawer et al.

(10) Patent No.: US 11,843,954 B2
(45) Date of Patent: Dec. 12, 2023

(54) HIGHLY AVAILABLE RADIO ACCESS NETWORK IN A SHARED SPECTRUM

(71) Applicant: Nokia Solutions and Networks Oy, Espoo (FI)

(72) Inventors: Mohammad Riaz Khawer, Wayland, MA (US); Milind M. Buddhikot, Bridgewater, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 372 days.

(21) Appl. No.: 17/273,901

(22) PCT Filed: Sep. 7, 2018

(86) PCT No.: PCT/US2018/049978
§ 371 (c)(1),
(2) Date: Mar. 5, 2021

(87) PCT Pub. No.: WO2020/050855
PCT Pub. Date: Mar. 12, 2020

(65) Prior Publication Data
US 2021/0352488 A1    Nov. 11, 2021

(51) Int. Cl.
*H04W 76/18* (2018.01)
*H04W 16/14* (2009.01)
(Continued)

(52) U.S. Cl.
CPC ........... *H04W 16/14* (2013.01); *H04W 24/08* (2013.01); *H04W 76/18* (2018.02); *H04W 76/25* (2018.02); *H04W 88/14* (2013.01)

(58) Field of Classification Search
CPC ..... H04W 16/14; H04W 24/08; H04W 76/18; H04W 76/25; H04W 88/14; H04W 72/23
See application file for complete search history.

(56) References Cited

U.S. PATENT DOCUMENTS

2015/0257024 A1* 9/2015 Baid ...................... H04W 76/22
370/338
2019/0132776 A1* 5/2019 Markwart ......... H04W 36/0072

FOREIGN PATENT DOCUMENTS

| CN | 107708212 A | 2/2018 | |
| WO | 2017/186294 A1 | 11/2017 | |
| WO | WO-2017186294 A1 * | 11/2017 | ............ H04W 16/14 |

OTHER PUBLICATIONS

"HAProxy ALOHA Hardware Load Balancer", HAProxy, Retrieved on Mar. 14, 2021, Webpage available at : https://www.haproxy.com/products/aloha-hardware-load-balancer/.
(Continued)

*Primary Examiner* — Said M Elnoubi
(74) *Attorney, Agent, or Firm* — Nokia Technologies Oy

(57) ABSTRACT

An apparatus (200) includes a transceiver (204) configured to establish a connection with a spectrum access server (SAS) (115, 116) and a processor (202) configured to monitor a status of the connection. The processor (202) is also configured to modify the connection to the SAS (115, 116) in response to the status indicating a possible failure of the connection. The processor (202) modifies the connection prior to expiration of a timeout interval for the connection to the SAS (115, 116). The apparatus (200) is a Citizens Band Service Device (CBSD) (131-133) or a domain proxy (DP) (130) that aggregates messages for multiple CBSDs.

15 Claims, 11 Drawing Sheets

(51) Int. Cl.
*H04W 76/25* (2018.01)
*H04W 24/08* (2009.01)
*H04W 88/14* (2009.01)

(56) References Cited

OTHER PUBLICATIONS

International Search Report and Written Opinion received for corresponding Patent Cooperation Treaty Application No. PCT/US2018/049978, dated Apr. 30, 2019, 15 pages.
Office action received for corresponding European Patent Application No. 18780268.1, dated May 3, 2023, 10 pages.

* cited by examiner

HIGHLY AVAILABLE RADIO ACCESS NETWORK IN A SHARED SPECTRUM

RELATED APPLICATION

This application was originally filed as PCT Application No. PCT/US2018/049978 on Sep. 7, 2018, each of which is incorporated herein by reference in its entirety.

BACKGROUND

Spectrum is the most precious commodity in deploying wireless networks such as a private enterprise network. Cellular communication systems, such as networks that provide wireless connectivity using Long Term Evolution (LTE) standards, provide more reliable service and superior quality-of-service (QoS) than comparable services provided by conventional contention-based services in unlicensed frequency bands, such as Wi-Fi. The most valuable spectrum available for cellular communication is at frequencies below 6 Gigahertz (GHz) because transmissions at these frequencies do not require a clear line of sight between the transmitter and the receiver. Much of the sub-6-GHz spectrum is already auctioned off as statically licensed spectrum to various mobile network operators (MNOs) that implement cellular communication system such as LTE networks. The 3.1-4.2 GHz spectrum is occupied by incumbents such as Fixed Satellite System (FSS) and federal incumbents such as U.S. government or military entities. For example, the 3550-3700 MHz frequency band (CBRS band) was previously reserved for exclusive use by incumbents including the United States Navy and Fixed Satellite Service (FSS) earth stations. This band of the spectrum is often highly underutilized. Consequently, organizations and vertical industries such as package distribution companies, energy producers, ports, mines, hospitals, and universities do not have access to sub-6-GHz spectrum and are therefore unable to establish private enterprise networks to provide cellular service such as LTE.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
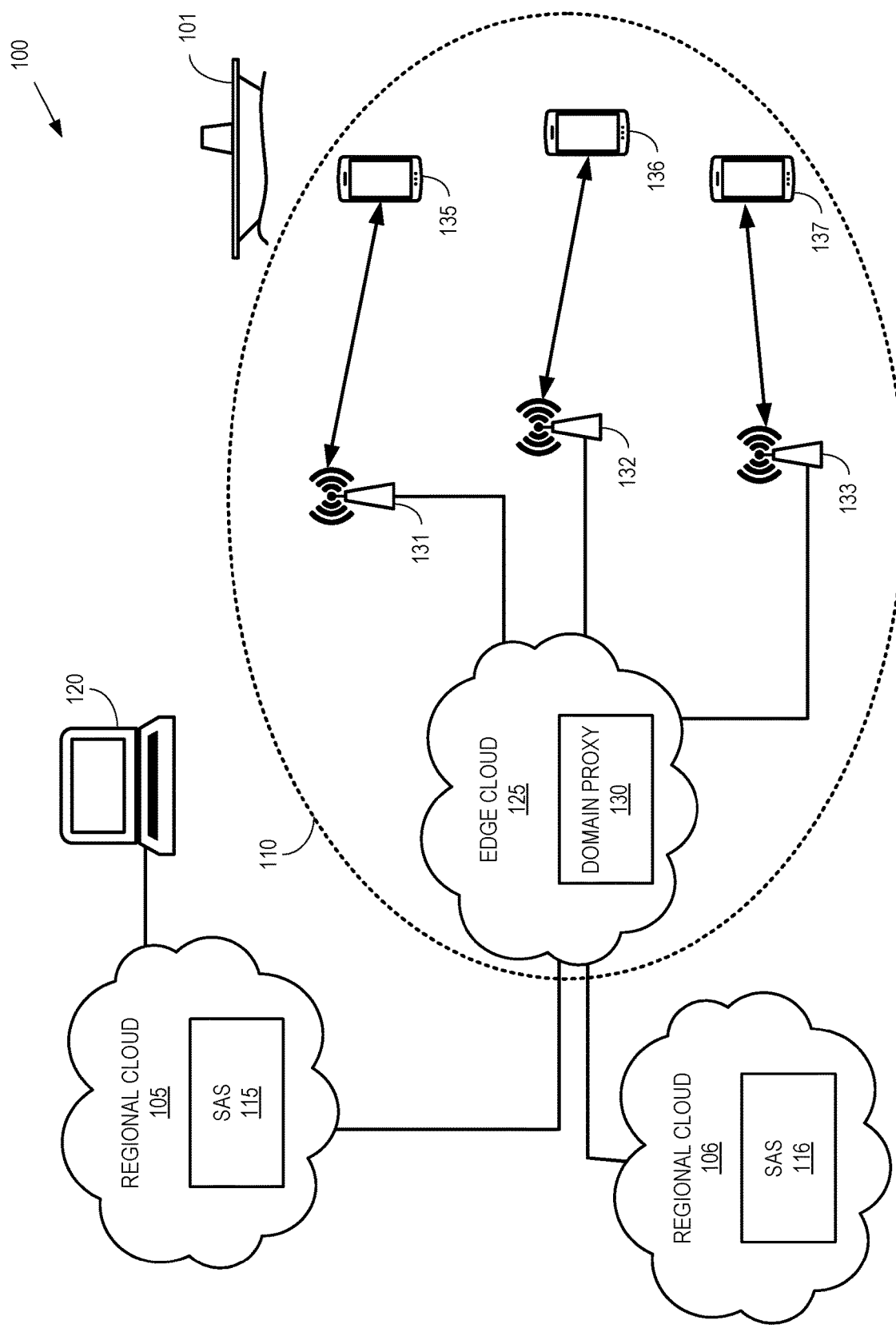
FIG. 1 is a block diagram of a communication system according to some embodiments.

The Federal Communication Commission (FCC) has begun offering bands of spectrum owned by federal entities for sharing with commercial operations. For example, newly issued FCC rules in 47 Code of Federal Regulations (CFR) Part 96 allows sharing of the 3550-3700 MHz Citizens Broadband Radio Service (CBRS) between incumbents and other operators. The CBRS operates according to a tiered access architecture that distinguishes between incumbents, operators that have received a priority access license (PAL) consistent with 47 CFR § 96.23, et seq., and general authorized access (GAA) operators that are authorized to implement one or more Citizens Broadband radioService Devices (CBSDs) consistent with 47 CFR § 96.33, et seq. Incumbents, PAL licensees, and GAA operators are required to request access from a spectrum access system (SAS), which allocates frequency bands to the operators, e.g., for CBRS within the 3550-3700 MHz band. The frequency bands are allocated to the CBSDs associated with the operators within particular geographical areas and, in some cases, during particular time intervals. The SAS determines whether incumbents are present within corresponding geographical areas using an environmental sensing capability (ESC) that performs incumbent detection, e.g., using radar to detect the presence of a Navy ship in a port. Each SAS is able to serve multiple private enterprise networks that include a large number of CBSDs such as base stations, eNodeBs, microcells, picocells, and the like.

The tiered access architecture provides priority access to incumbents, which include Grandfathered Wireless Broadband Licensees that are authorized to operate on a primary basis on frequencies designated in 47 CFR § 96.11. When an incumbent is present in a particular geographical area, the incumbent is granted exclusive access to a portion of the CBRS spectrum. For example, if a Navy ship enters a port, communication systems on the ship are granted exclusive access to a 20-40 MHz band within the 3550-3700 MHz band. Operators that have received a PAL and GAA operators are required to vacate the band allocated to the ship. A PAL license grants exclusive access to a portion of the 3550-3700 MHz band within a predetermined geographical area as long as no incumbents have been allocated an overlapping portion of the 3550-3700 MHz band within the predetermined geographical area. The GAA operators are given access to a portion of the 3550-3700 MHz band within a geographic area as long as no incumbents or PAL licensees have been allocated an overlapping portion in the same geographic area during a concurrent time interval. The GAA operators are also required to share the allocated portion of the 3550-3700 MHz band if other GAA operators are allocated the same portion.

Each CBSD that provides wireless connectivity in the CBRS spectrum must be under direct control of an SAS. The CBSDs therefore register with an SAS to begin providing wireless connectivity. The status of the CBSDs is monitored using heartbeat messages exchanged between a registered CBSD and its controlling SAS. The heartbeat messages are exchanged at predetermined time intervals (e.g., 20 seconds, 30 seconds, 60 seconds, and the like) and registration of the CBSD with the SAS is maintained as long as at least one heartbeat message is successfully received within a timeout interval such as 240 seconds or 300 seconds or other timeout interval. A break in the heartbeat messages for more than the timeout interval causes the CBSD to stop their transmissions on the channel granted by the SAS in the CBRS band and thus incur a service downtime that is not acceptable for commercial deployment. In some case, a CBSD (or a domain proxy, DP, that aggregates messages for multiple CBSDs) detects break in the heartbeat messages due to network connectivity issues even though the controlling SAS is functional and continuing to transmit heartbeat messages. The network connectivity issues can include a disruption or degradation of bandwidth associated with an SAS interface network port, backhaul connectivity between the edge cloud infrastructure and an SAS regional cloud, and the like. Service downtime due to a break and network connectivity between a CBSD or DP and the corresponding instance of an SAS is not acceptable for commercial deployments.

One approach to providing high-availability is to implement geo-redundancy, e.g., by associating each CBSD with a primary SAS in one location and a secondary SAS in another location. If the primary SAS goes down, the CBSDs connect to the secondary SAS and resume CBRS band operation. However, switching between the primary SAS and the secondary SAS requires that the CBSD stop its current CBRS band operation on the channel granted by the primary SAS to comply with CBRS band rules established by the FCC. The CBRS then transmits a registration request to the secondary SAS to acquire a new channel in the shared spectrum for providing wireless connectivity. The secondary SAS allocates the channel to the CBSD by transmitting a grant message. Laboratory performance testing has shown that switching between geo-redundant SASs causes a service down time of several minutes for the CBSD. A service downtime of this duration is not acceptable to many customers such as industrial automation customers that do not have access to any licensed spectrum besides the CBRS shared spectrum. Consequently, geo-redundant SAS instances alone do not solve the problem of service interruption for the CBRS band network and require additional architectural solutions to avoid any potential service downtime that may result from switching between geo redundant SAS instances.

FIGS. 1-11 disclose a high availability architecture that implements network redundancies to ensure reliable connections between fully operational instances of an SAS on a regional cloud and a domain proxy (DP) or CBSD implemented in a radio access network (RAN) edge cloud infrastructure. In some embodiments, the architecture includes geo-redundant instances of an SAS that associate each CBSD (or DP) with a primary SAS in one location and a secondary SAS in another location. The CBSD (or DP) monitors a connection between the CBSD (or DP) and a first port of an associated SAS, which is a primary SAS if the architecture includes geo-redundant instances of the SAS. Some embodiments of the CBSD (or DP) monitor message latency over the connection or numbers of consecutive failures of heartbeat messages exchanged between the CBSD (or DP) and the SAS. If the indicator indicates a possible failure of the connection with the first port, the CBSD (or DP) switches the connection from the first port to a second port of the associated SAS. Different ports of the associated SAS are indicated by different Internet protocol (IP) addresses. The switch is performed prior to expiration of a timeout interval (such as 240 seconds or 300 seconds) so that the CBSD (or DP) is not forced to shut down and can continue transmission. The process iterates until the CBSD (or DP) locates a functional port to the associated SAS, e.g., based on a measured message latency or successful reception of heartbeat messages, or until the CBSD (or DP) has attempted to connect to the SAS via all the available ports. If the CBSD (or DP) is not able to locate a functional port to the associated SAS, the CBSD (or DP) switches connectivity to a secondary SAS such as a geo-redundant secondary SAS.

In some embodiments, network redundancies are provided by redundant backhaul links between the edge cloud infrastructure and a regional cloud. Examples of redundant backhaul links include links supported by satellite backhaul, fiber, dial-up modems, and the like. The bandwidth required on the redundant backhaul links is relatively small because the amount of CBRS signaling between the CBSD (or DP) implemented in the edge cloud and instances of the SAS implemented in the regional cloud is relatively small. The CBSD (or DP) monitors the connection implemented over one of the backhaul links. If the monitoring by the CBSD (or DP) indicates a possible failure of the connection on a first backhaul link, the CBSD (or DP) switches the connection to a different backhaul link. The process iterates until a functional backhaul link is detected or all of the backhaul links have been attempted unsuccessfully. If the CBSD (or DP) is unable to find a satisfactory backhaul link, the CBSD (or DP) reverts to a local instance of an SAS or the DP acts as an SAS proxy to maintain operation of the CBSD concurrently with raising alarms for remedial actions. Using a local SAS instance or an SAS proxy is appropriate in regions that are distant from dynamic protection areas (DPAs) and are therefore unlikely to be affected by incumbent entities, e.g., in central regions of a country far from coastal regions. Some embodiments of the regional cloud mirror software components of a data center to reduce the likelihood of a breaking communication due to a failed component in the regional cloud.

FIG. 1 is a block diagram of a communication system 100 according to some embodiments. The communication system 100 operates in accordance with the FCC rules set forth in 47 Code of Federal Regulations (CFR) Part 96, which allows sharing of the 3550-3700 MHz Citizens Broadband Radio Service (CBRS) between incumbents and other operators. However, some embodiments of the communication system 100 operate in accordance with other rules, standards, or protocols that support sharing of a frequency band between incumbents and other devices such that the frequency band is available for exclusive allocation to an incumbent device if the incumbent device is present in a geographic area. In that case, the other devices are required to vacate any portion of the frequency band that overlaps with another portion of the frequency band that is allocated to the incumbent device. For example, if the communication system 100 is deployed (at least in part) proximate a port and a Navy ship such as an aircraft carrier 101 arrives in the port, devices in a geographic area proximate the port that are providing wireless connectivity in a portion of the frequency band allocated to the aircraft carrier 101 are required to vacate the portion of the frequency band to provide the aircraft carrier 101 with exclusive access to the frequency band within the geographic area.

The communication system 100 includes a regional cloud 105 that provides cloud-based support for a private enterprise network 110. Some embodiments of the regional cloud 105 include one or more servers that are configured to provide operations and maintenance (O&M) management, a customer portal, network analytics, software management, and central security for the private enterprise network 110. The regional cloud 105 also includes an SAS instance 115 to allocate frequency bands to operators, e.g., to the private enterprise network 110 for CBRS within the 3550-3700 MHz band. The communication system 100 also includes another regional cloud 106 that includes an SAS instance 116. In the illustrated embodiment, the regional clouds 105, 106 are located at different geographic locations and are therefore used to provide geo-redundancy. The SAS instance 116 is therefore referred to as a geo-redundant SAS instance 116 in some cases. The redundant instances of the SAS instance 115, 116 communicate with each other over an SAS-SAS interface (not shown in FIG. 1 of the interest of clarity). Some embodiments of the communication system 100 include additional regional clouds and SAS instances, which may or may not be geo-redundant and communicate over corresponding SAS-SAS interfaces. The SASs 115, 116 can serve multiple private enterprise networks, although a single private enterprise network 110 is shown in FIG. 1 in the interest of clarity. Operation of the SASs 115, 116 is disclosed in more detail below.

The regional clouds 105, 106 are configured via user interface portals to one or more external computers 120, only one shown in FIG. 1 in the interest of clarity. For example, the external computer 120 provides a customer user interface portal for service management, a digital automation cloud management user interface portal, and an SAS user interface portal that is used to configure the SASs 115, 116.

The private enterprise network 110 includes an edge cloud 125 that communicates with the regional clouds 105, 106 to support a plug-and-play deployment of the private enterprise network 110. Some embodiments of the edge cloud 125 support auto configuration and self-service, industrial protocols, local connectivity with low latency, LTE-based communication and local security, high availability, and other optional applications for the private enterprise network 110. In the illustrated embodiment, the edge cloud 125 implements a domain proxy 130 that provides managed access and policy control to a set of CBSDs 131, 132, 133 that are implemented using base stations, base station routers, mini-macrocells, microcells, indoor/outdoor picocells, femtocells, and the like. As used herein, the term "base station" refers to any device that provides wireless connectivity and operates as a CBSD in the private enterprise network 110 as either category A CBSD (Indoor), Category B CBSD (outdoor), or customer premises equipment (CPE). The CBSDs 131, 132, 133 are therefore referred to herein as the base stations 131, 132, 133 and collectively as "the base stations 131-133." Some embodiments of the domain proxy 130 are implemented in the regional clouds 105, 106.

The domain proxy 130 mediates between the SASs 115, 116 and the base stations 131-133. In order to utilize the shared spectrum, the base stations 131-133 transmit requests towards one of the SASs 115, 116 to request allocation of a portion of a frequency band. As discussed herein, the domain proxy 130 identifies one of the SASs 115, 116 as a primary SAS that is initially used to support communication in the shared spectrum and the other one of the SASs 115, 116 as a secondary SAS, which is used as a fallback in case of a disruption of service to the primary SAS. The requests include information identifying the portion of the frequency band such as one or more channels, a geographic area corresponding to a coverage area of the requesting base station, and, in some cases, a time interval that indicates when the requested portion of the frequency band is to be used for communication. In the illustrated embodiment, the coverage area of the base stations 131-133 corresponds to the area encompassed by the private enterprise network 110. Some embodiments of the domain proxy 130 reduce the signal load between the domain proxy 130 and the SASs 115, 116 by aggregating requests from multiple base stations 131-133 into a smaller number of messages that are transmitted from the domain proxy 130 to the SASs 115, 116. The base stations 131-133 provide wireless connectivity to corresponding user equipment 135, 136, 137 (collectively referred to herein as "the user equipment 135-137") in response to the SAS instance 115 allocating portions of the frequency band to the base stations 131-133.

The requests transmitted by the base stations 131-133 do not necessarily include the same information. Some embodiments of the requests from the base stations 131-133 include information indicating different portions of the frequency band, different geographic areas, or different time intervals. For example, the base stations 131-133 request portions of the frequency band for use in different time intervals if the private enterprise network 110 is deployed in a mall or shopping center and the base stations 131-133 are used to provide wireless connectivity within different stores that have different operating hours. The domain proxy 130 therefore manages the base stations 131-133 using separate (and potentially different) policies on a per-CBSD basis. In some embodiments, the domain proxy 130 accesses the policies for the base stations 131-133 in response to receiving a request from the corresponding base station 131-133. The domain proxy 130 determines whether the base station 131-133 is permitted to access the SAS instance 115 based on the policy, e.g., by comparing information in the policy to information in one or more mandatory fields of the request. The domain proxy 130 selectively provides the requests to the SASs 115, 116 depending on whether the base station 131-133 is permitted to access the SASs 115, 116. If so, the request is transmitted to the SASs 115, 116 or aggregated with other requests for transmission to the SASs 115, 116. Otherwise, the request is rejected.

Figure 2:
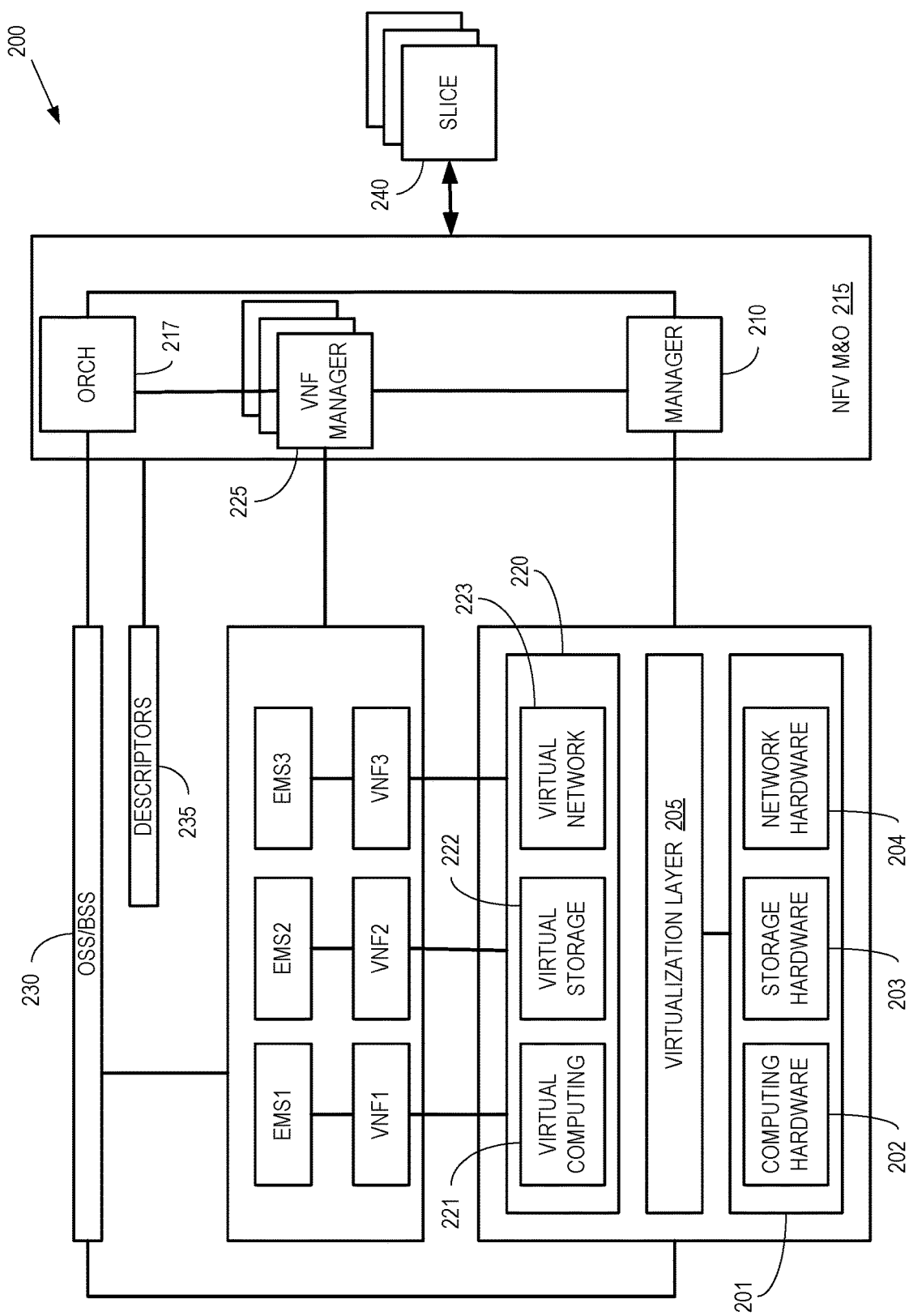
FIG. 2 is a block diagram of a network function virtualization (NFV) architecture according to some embodiments.

FIG. 2 is a block diagram of a network function virtualization (NFV) architecture 200 according to some embodiments. The NFV architecture 200 is used to implement some embodiments of the communication system 100 shown in FIG. 1. The NFV architecture 200 includes hardware resources 201 including computing hardware 202 such as one or more processors or other processing units, storage hardware 203 such as one or more memories, and network hardware 204 such as one or more transmitters, receivers, or transceivers. A virtualization layer 205 provides an abstract representation of the hardware resources 201. The abstract representation supported by the virtualization layer 205 can be managed using a virtualized infrastructure manager 210, which is part of the NFV management and orchestration (M&O) module 215. Some embodiments of the manager 210 are configured to collect and forward performance measurements and events that may occur in the NFV architecture 200. For example, performance measurements may be forwarded to an orchestrator (ORCH) 217 implemented in the NFV M&O 215. The hardware resources 201 and the virtualization layer 205 may be used to implement virtual resources 220 including virtual computing resources 221, virtual storage resources 222, and virtual networking resources 223.

Virtual networking functions (VNF1, VNF2, VNF3) run over the NFV infrastructure (e.g., the hardware resources 201) and utilize the virtual resources 220. For example, the virtual networking functions (VNF1, VNF2, VNF3) may be implemented using virtual machines supported by the virtual computing resources 221, virtual memory supported by the virtual storage resources 222, or virtual networks supported by the virtual network resources 223. Element management systems (EMS1, EMS2, EMS3) are responsible for managing the virtual networking functions (VNF1, VNF2, VNF3). For example, the element management systems (EMS1, EMS2, EMS3) may be responsible for fault and performance management. In some embodiments, each of the virtual networking functions (VNF1, VNF2, VNF3) is controlled by a corresponding VNF manager 225 that exchanges information and coordinates actions with the manager 210 or the orchestrator 217.

The NFV architecture 200 may include an operation support system (OSS)/business support system (BSS) 230. The OSS/BSS 230 deals with network management including fault management using the OSS functionality. The OSS/BSS 230 also deals with customer and product management using the BSS functionality. Some embodiments of the NFV architecture 200 use a set of descriptors 235 for storing descriptions of services, virtual network functions, or infrastructure supported by the NFV architecture 200. For example, the descriptors 235 can be used to store descriptions of a virtual network function implementation of the agent 175 shown in FIG. 1. Information in the descriptors 235 may be updated or modified by the NFV M&O 215.

The NFV architecture 200 can be used to implement network slices 240 that provide user plane or control plane functions. A network slice 240 is a complete logical network that provides communication services and network capabilities, which can vary from slice to slice. User equipment can concurrently access multiple slices. Some embodiments of user equipment provide Network Slice Selection Assistance Information (NSSAI) parameters to the network to assist in selection of a slice instance for the user equipment. A single NSSAI may lead to the selection of several slices. The NFV architecture 200 can also use device capabilities, subscription information and local operator policies to do the selection. An NSSAI is a collection of smaller components, Single-NSSAIs (S-NSSAI), which each include a Slice Service Type (SST) and possibly a Slice Differentiator (SD). Slice service type refers to an expected network behavior in terms of features and services (e.g., specialized for broadband or massive IoT), while the slice differentiator can help selecting among several network slice instances of the same type, e.g. to isolate traffic related to different services into different slices.

Figure 3:
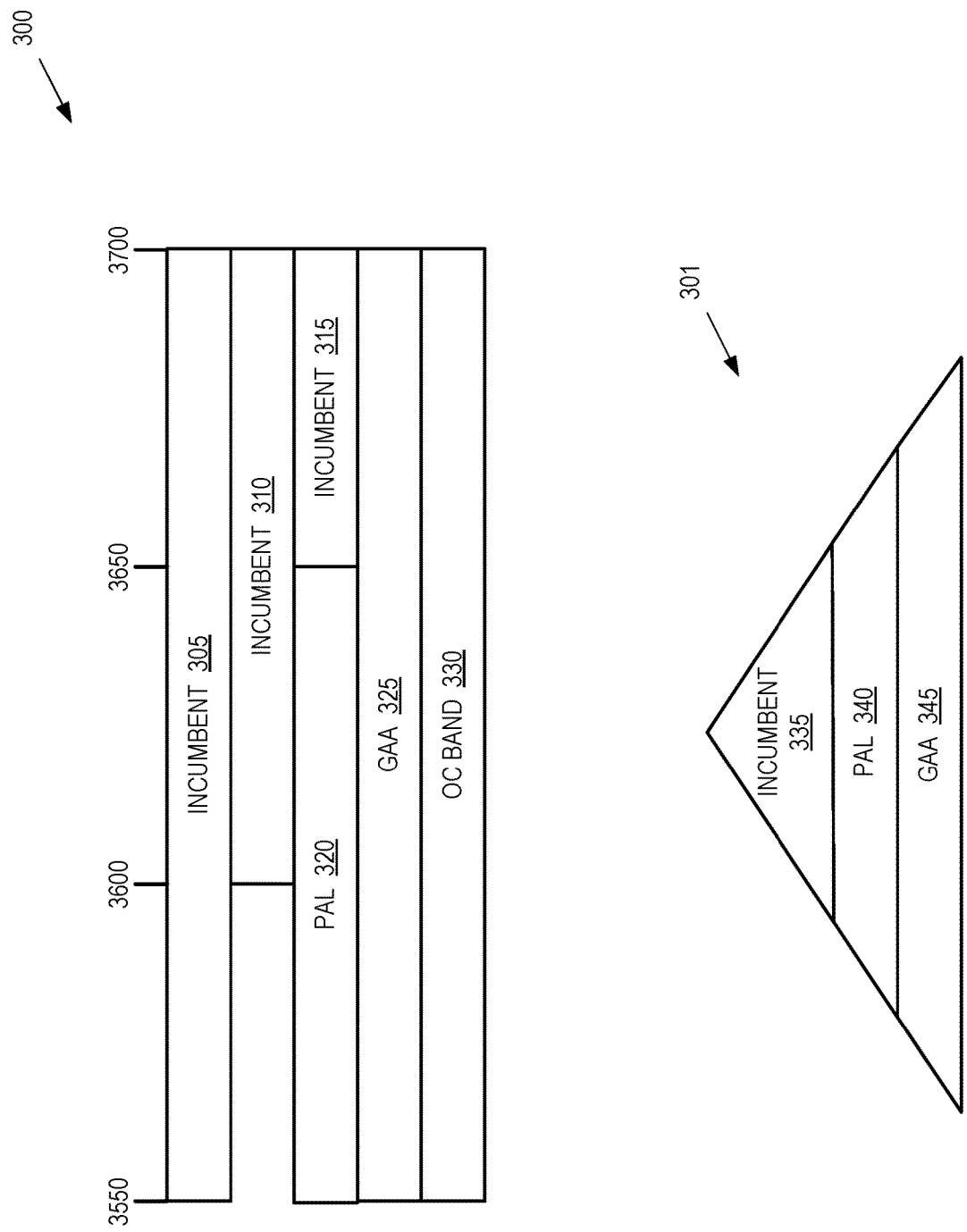
FIG. 3 is a block diagram illustrating an allocation of frequency bands and an access priority for incumbents, licensed users, and general access users according to some embodiments.

FIG. 3 is a block diagram illustrating an allocation 300 of frequency bands and an access priority 301 for incumbents, licensed users, and general access users according to some embodiments. The allocation 300 and the access priorities 301 are used to determine whether CBSDs such as the base stations 131-133 shown in FIG. 1 are given permission to establish a wireless communication links in portions of the frequency band. The frequency band extends from 3550 MHz to 3700 MHz and therefore corresponds to the spectrum allocated for CBRS. An SAS such as the SASs 115, 116 shown in FIG. 1 allocates portions of the frequency band to devices for providing wireless connectivity within a geographic area. For example, the SAS can allocate 20-40 MHz portions of the frequency band to different devices for use as communication channels.

Portions of the frequency band are allocated to incumbent federal radio location devices, such as Navy ships, from the block 305, which corresponds to all of the frequencies in the available frequency band. Portions of the frequency band are allocated to incumbent FSS receive-only earth stations from the block 310. Portions of the frequency band are allocated to grandfathered incumbent wireless broadband services from the block 315. As discussed herein, the portions of the frequency band are allocated from the blocks 305, 310, 315 for exclusive use by the incumbent.

Operators that have received a priority access license (PAL) consistent with 47 CFR § 96.23, et seq. are able to request allocation of portions of the frequency band in the block 320. The portion of the frequency band that is allocated to an operator holding a PAL is available for exclusive use by the operator in the absence of any incumbents in an overlapping frequency band and geographic area. For example, the SAS can allocate a PAL channel in any portion of the entire 150 MHz of CBRS band as long as it is not pre-empted by the presence of an incumbent. Portions of the frequency band within the block 325 are available for allocation to general authorized access (GAA) operators that are authorized to implement one or more CBSDs consistent with 47 CFR § 96.33, et seq. The GAA operators provide wireless connectivity in the allocated portion in the absence of any incumbents or PAL licensees on an overlapping frequency band and geographic area. The GAA operators are also required to share the allocated portion with other GAA operators, if present. Portions of the frequency band within the block 330 are available to other users according to protocols defined by the Third Generation Partnership Project (3GPP).

The access priority 301 indicates that incumbents have the highest priority level 335. Incumbents are therefore always granted exclusive access to a request to portion of the frequency band within a corresponding geographic area. Lower priority operators are required to vacate the portion of the frequency band allocated to the incumbents within the geographic area. The access priority 301 indicates that PAL licensees have the next highest priority level 340, which indicates that PAL licensees receive exclusive access to an allocated portion of the frequency band in the absence of any incumbents. The PAL licensees are also entitled to protection from other PAL licensees within defined temporal, geographic, and frequency limits of their PAL. The GAA operators (and, in some cases, operators using other 3GPP protocols) received the lowest priority level 345. The GAA operators are therefore required to vacate portions of the frequency band that overlap with portions of the frequency band allocated to either incumbents or PAL licensees within an overlapping geographic area.

Figure 4:
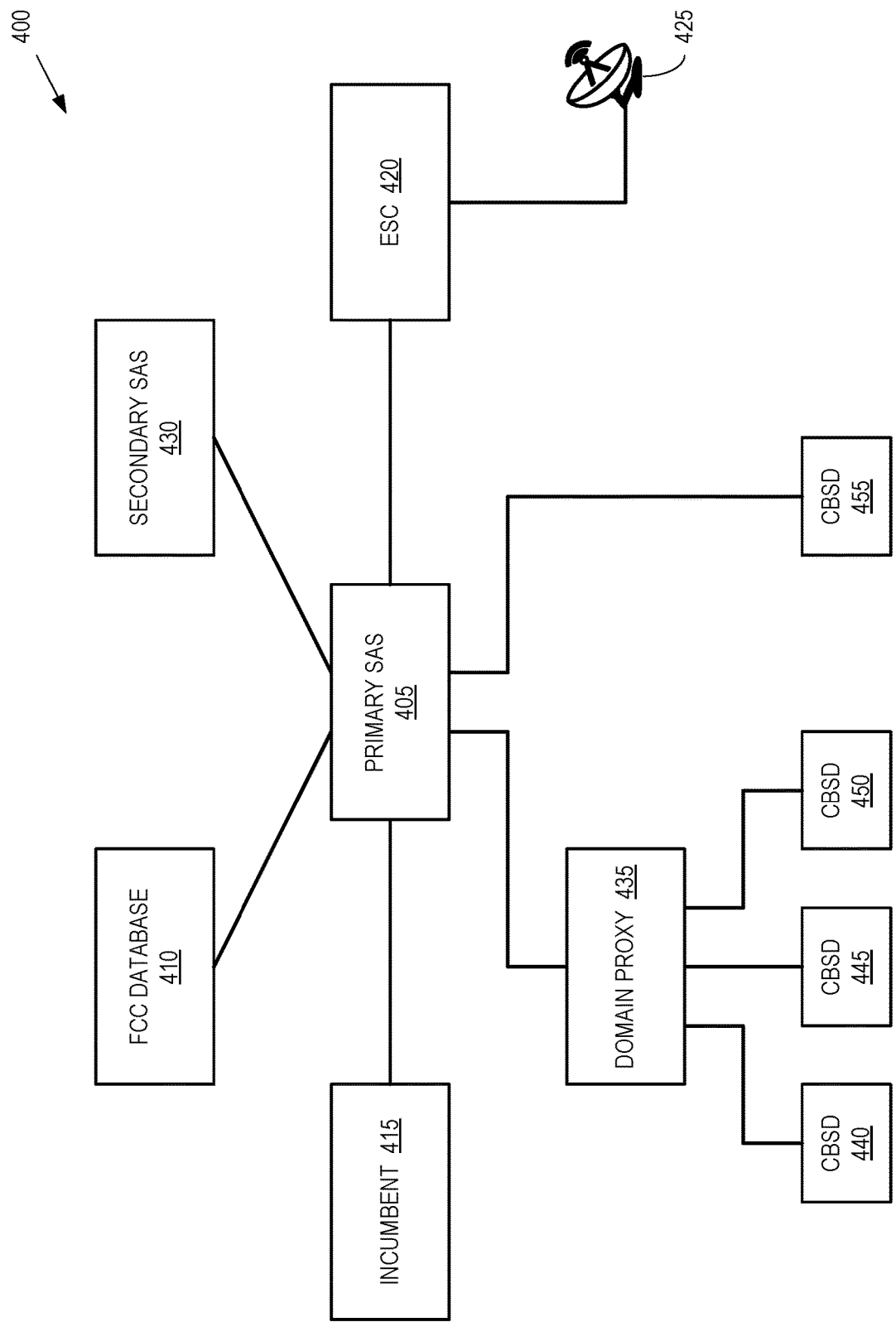
FIG. 4 is a block diagram of a communication system that implements tiered spectrum access according to some embodiments.

FIG. 4 is a block diagram of a communication system 400 that implements tiered spectrum access according to some embodiments. In the illustrated embodiment, the communication system 400 implements tiered spectrum access in the 3550-3700 CBRS band via a WInnForum architecture. The communication system 400 includes an SAS instance 405 that performs operations including incumbent interference determination and channel assignment, e.g., for CBRS channels shown in FIG. 3. In the illustrated embodiment, the SAS instance 405 is a primary SAS. An FCC database 410 stores a table of frequency allocations that indicate frequencies allocated to incumbent users and PAL licensees. An informing incumbent 415 provides information indicating the presence of the incumbent (e.g., a coverage area associated with the incumbent, and allocated frequency range, a time interval, and the like) to the SAS instance 405. The SAS instance 405 allocates other portions of the frequency range to provide exclusive access to the informing incumbent 415 within the coverage area. An environmental sensing capability (ESC) 420 performs incumbent detection to identify incumbents using a portion of a frequency range within the geographic area, e.g., using a radar sensing apparatus 425. Some embodiments of the SAS instance 405 are connected to other SAS instance 430 via corresponding interfaces so that the SAS instance 405, 430 coordinate allocation of portions of the frequency range in geographic areas or time intervals. In the illustrated embodiment, the SAS instance 430 is a secondary SAS that is geo-redundant with the primary SAS instance 415.

A domain proxy 435 mediates communication between the SAS instance 405 and one or more CBSD 440, 445, 450 via corresponding interfaces. The domain proxy 435 receives channel access requests from the CBSDs 440, 445, 450 and verifies that the CBSDs 440, 445, 450 are permitted to request channel allocations from the SAS instance 405. The domain proxy 435 forwards requests from the permitted CBSDs 440, 445, 450 to the SAS instance 405. In some embodiments, the domain proxy 435 aggregates the requests from the permitted CBSDs 440, 445, 450 before providing the aggregated request to the SAS instance 405. The domain proxy 435 aggregates requests based on an aggregation function that is a combination of two parameters: (1) a maximum number of requests that can be aggregated into a single message and (2) a maximum wait duration for arrival of requests that are to be aggregated into a single message. For example, if the wait duration is set to 300 ms and the maximum number of requests is 500, the domain proxy accumulates receive requests until the wait duration reaches 300 ms or the number of accumulated requests which is 500, whichever comes first. If only a single request arrives within the 300 ms wait duration, the "aggregated" message includes a single request.

Thus, from the perspective of the SAS instance 405, the domain proxy 435 operates as a single entity that hides or abstracts presence of the multiple CBSDs 440, 445, 450 and conveys communications between the SAS instance 405 and the CBSDs 440, 445, 450. One or more CBSD 455 (only one shown in the interest of clarity) are connected directly to the SAS instance 405 and can therefore transmit channel access requests directly to the SAS instance 405. Additional discussion of this architecture is provided in Appendix B, from the Wireless Innovation Forum, entitled "Requirements for Commercial Operation in the U.S. 3550-3700 MHz Citizens Broadband Radio Service Band", Working Document WINNF-TS-0112, Version V1.4.130, Jan. 16, 2018, which is incorporated by reference herein in its entirety.

Figure 5:
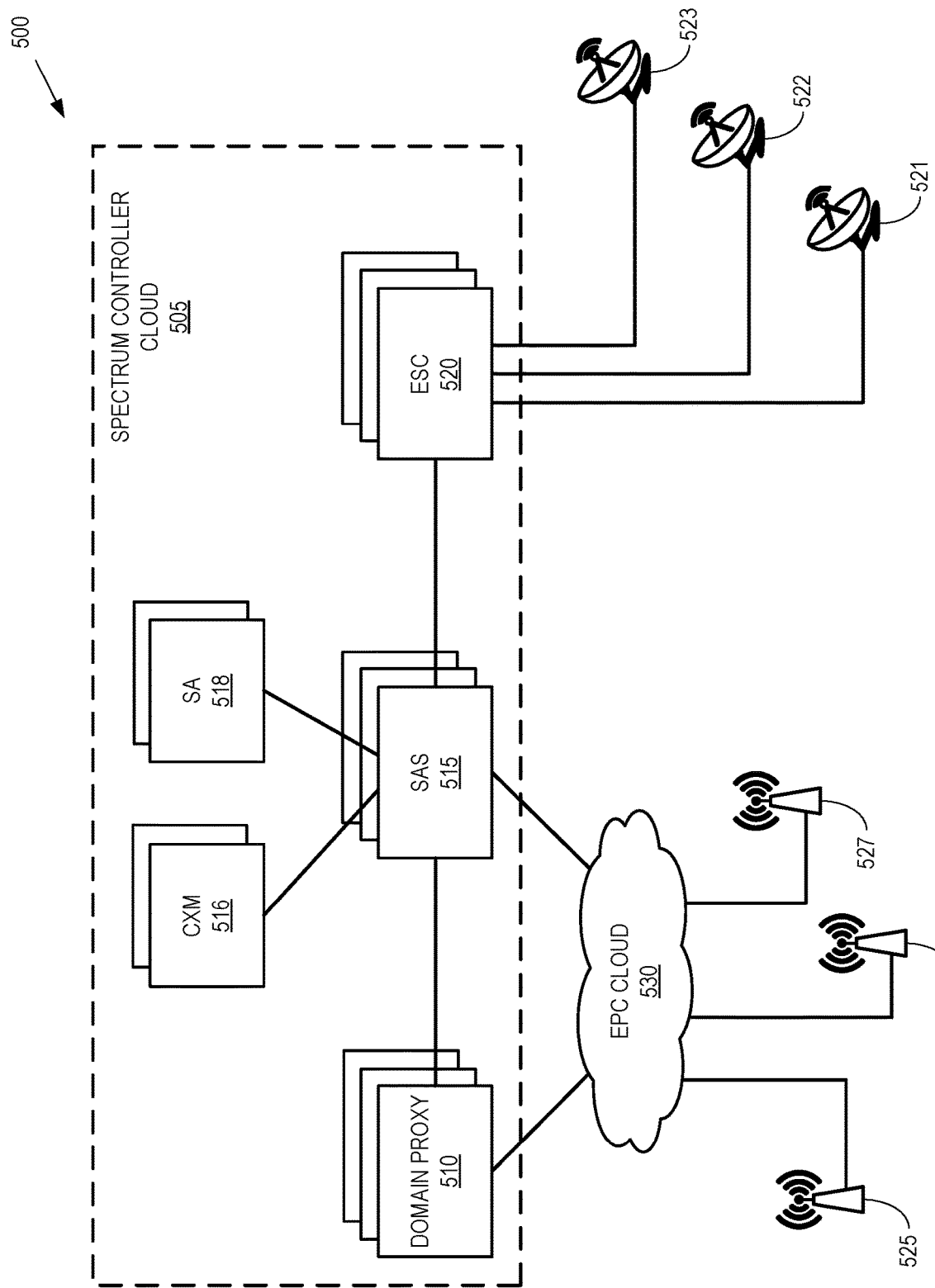
FIG. 5 is a block diagram of a communication system that implements a spectrum controller cloud to support deployment of private enterprise networks in a shared spectrum according to some embodiments.

FIG. 5 is a block diagram of a communication system 500 that implements a spectrum controller cloud 505 to support deployment of private enterprise networks in a shared spectrum according to some embodiments. The spectrum controller cloud 505 instantiates multiple instances of domain proxies 510 that support one or more private enterprise networks. The spectrum controller cloud 505 also instantiates multiple SAS instances 515 that support one or more private enterprise networks. Although not shown in FIG. 5, the SAS instances 515 can be connected to other SAS instances, e.g., in other clouds, via corresponding interfaces.

Some embodiments of the SAS instances 515 are geo-redundant with each other. One of the SAS instances 515 can therefore be selected as a primary SAS and another one of the SAS instances 515 can be selected as a corresponding secondary SAS. Coexistence management (CXM) functions 516 and spectrum analytics (SA) functions 518 are also instantiated in the spectrum controller cloud 505.

One or more ESC instances 520 are instantiated and used to detect the presence of incumbents. In the illustrated embodiment, standalone ESC sensors 521, 522, 523 (collectively referred to herein as "the sensors 521-523") are used to monitor a frequency band to detect the presence of an incumbent such as a Navy ship near a port or harbor. The ESC instances 520 notify the corresponding instance of the SAS instance 515 in response to detecting the presence of an incumbent in a corresponding geographic area. The SAS instance 515 is then able to instruct non-incumbent devices that serve the geographic area to vacate portions of the spectrum overlapping with the spectrum allocated to the incumbent, e.g., by defining a DPA.

One or more base stations 525, 526, 527 (collectively referred to herein as "the base stations 525-527") in a private enterprise network communicate with one or more of the domain proxies 510 and the SAS instances 515 via an evolved packet core (EPC) cloud 530. The base stations 525-527 have different operating characteristics. For example, the base station 525 operates according to a PAL in the 3.5 GHz frequency band, the base station 526 operates according to GAA in the 3.5 GHz frequency band, and the base station 525 operates according to a PAL and GAA in the 3.5 GHz frequency band. The base stations 525-527 are configured as Category A (indoor operation with a maximum power of 30 dBm), Category B (outdoor operation with a maximum power of 47 dBm), or CPE. However, in other embodiments, one or more of the base stations 525-527 are configured as either Category A, Category B, or CPE. The EPC cloud 530 provides functionality including LTE EPC operation support system (OSS) functionality, analytics such as traffic analytics used to determine latencies, and the like.

Figure 6:
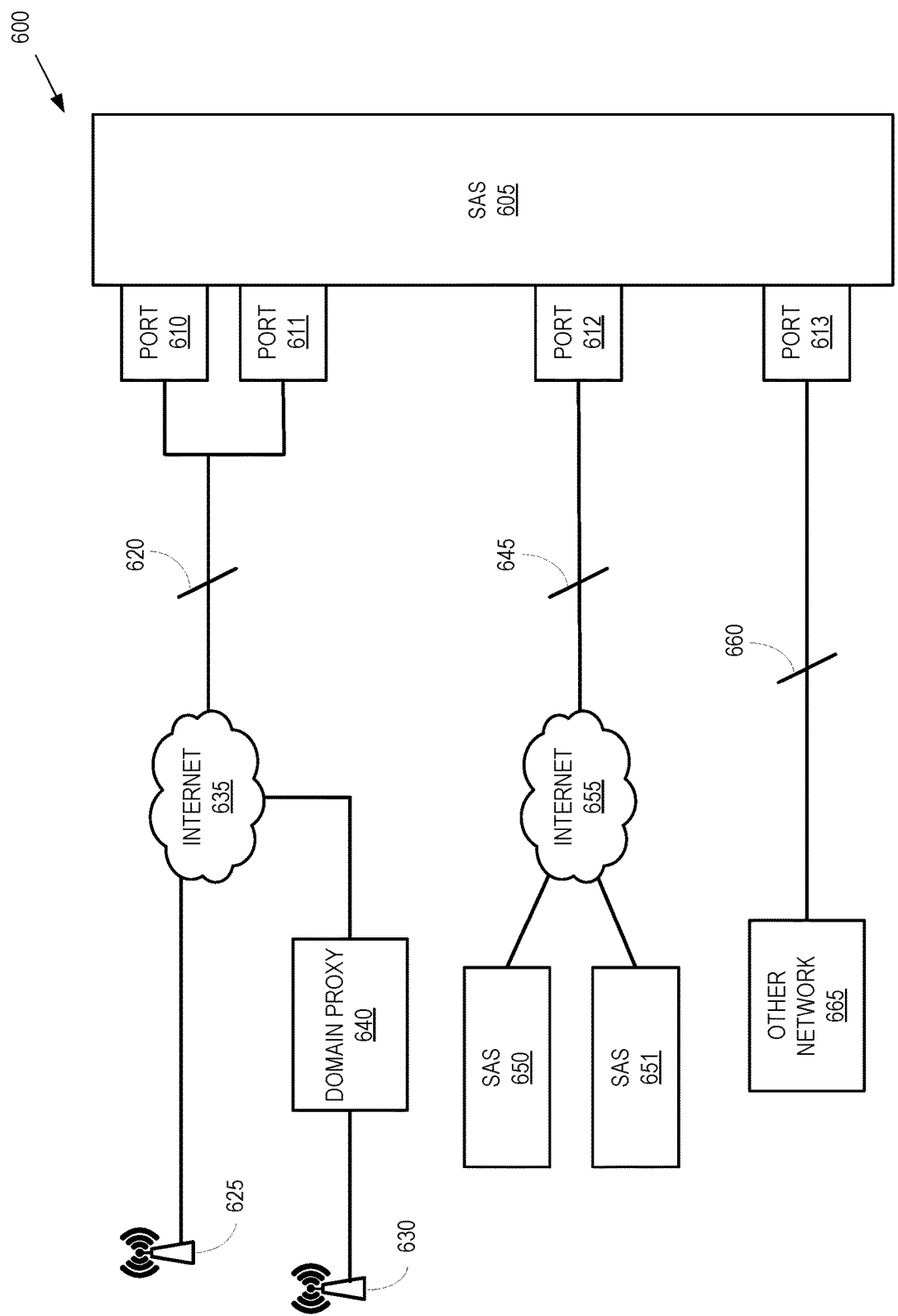
FIG. 6 is a block diagram of communication system including interfaces between citizens broadband radio service devices (CBSDs) and a spectrum access system (SAS) according to some embodiments.

FIG. 6 is a block diagram of communication system 600 including interfaces between CBSDs and an SAS instance 605 according to some embodiments. The SAS instance 605 is used to implement some embodiments of the SAS instance 115 shown in FIG. 1, the SAS instance 405, 430 shown in FIG. 4, and the instances of the SAS instance 515 shown in FIG. 5. The SAS instance 605 includes ports 610, 611, 612, 613 (collectively referred to herein as "the ports 610-613") that provide access to the SAS instance 605. In the illustrated embodiment, the SAS instance 605 is selected as a primary SAS.

An interface 620 supports communication between the SAS instance 605 and CBSDs 625, 630 via a network such as the Internet 635 and the ports 610, 611. The CBSD 625 is connected directly to the SAS instance 605 via the interface 620. The CBSD 630 is connected to the SAS instance 605 via a domain proxy 640 that is connected to the SAS instance 605 by the interface 620. The domain proxy 640 corresponds to some embodiments of the domain proxy 130 shown in FIG. 1, the domain proxy 435 shown in FIG. 4, and the instances of the domain proxy 510 shown in FIG. 5. An interface 645 supports communication between the SAS instance 605 and one or more other SASs 650, 651 (only one shown in FIG. 6 in the interest of clarity) via a network such as the Internet 655 and the port 612. The SASs 650, 651 can be owned and operated by other providers. Some embodiments of the SASs 650, 651 are selected as secondary SAS to support the primary SAS instance 605. An interface 660 supports communication between the SAS instance 605 and one or more other networks 665 (only one shown in FIG. 6 in the interest of clarity) via the port 613.

Figure 7:
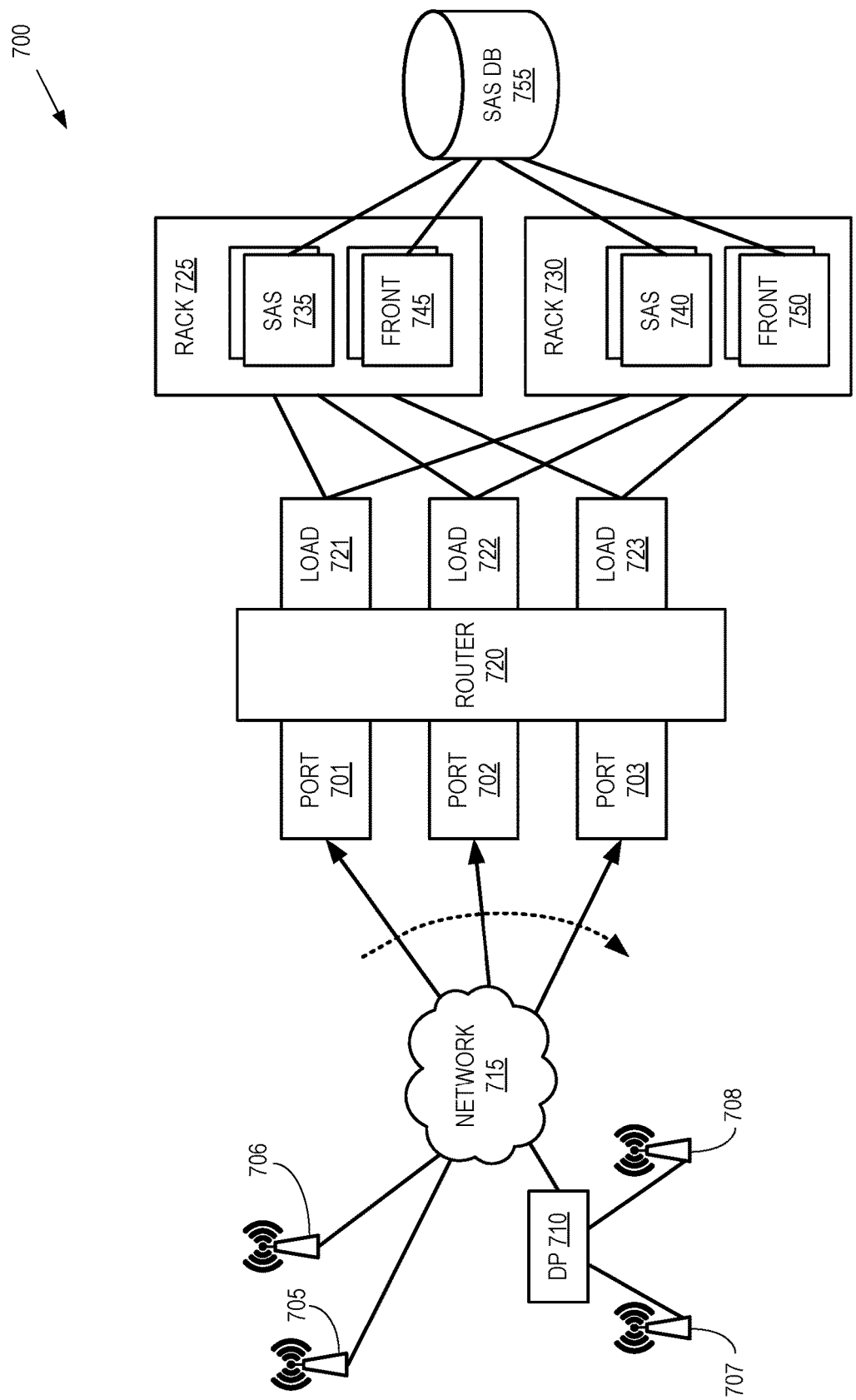
FIG. 7 is a block diagram of communication system that provides access to SAS instances via redundant ports according to some embodiments.

FIG. 7 is a block diagram of communication system 700 that provides access to SAS instances via redundant ports 701, 702, 703 according to some embodiments. The communication system 700 is used to implement some embodiments of a regional data center such as regional data centers located in different locations throughout the United States. The communication system 700 includes base stations 705, 706, 707, 708 (referred to collectively herein as "the base stations 705-708") and a domain proxy 710 that aggregates messages associated with the base stations 707, 708. The base stations 705-708 and the domain proxy 710 access the redundant ports 701-703 via a network 715 (such as the Internet) using different addresses such as different Internet protocol (IP) addresses. Some embodiments of the communication system 700 are accessed by resolving a domain name of the communication system 700 (such as sas.east-.ndac.com) to a domain name server (DNS) entry including records corresponding to the IP addresses of the ports 701-703.

The ports 701-703 are connected to a router 720 that utilizes one or more load-balancing elements 721, 722, 723, which are collectively referred to herein as "the load-balancing elements 721-723." The communication system 700 includes one or more racks 725, 730 and each of the racks 725, 730 holds or implements multiple instances of an SAS instance 735, 740 (which may be referred to as an SAS core) and multiple instances of a web front-end 745, 750 that is used to facilitate interconnections between the entities in the communication system 700. The SAS instance 735, 740 collectively constitute one geo redundant SAS instance such as the primary SAS instance 405 in FIG. 4. The router 720 and the load-balancing elements 721-723 route packets to the SAS instances 735, 740. The communication system 700 also includes a reliable, fault-tolerant SAS database 755 to store records for the base stations 705-708. The records are used to store channel and state information for the base stations 705-708.

In operation, the base stations 705-708 or the domain proxy 710 establish a connection via one of the ports 701-703. For example, the domain proxy 710 initially establishes a connection via the port 701. The router 720 and one or more of the load-balancing elements 721-723 route the connection to one of the SAS instances 735, 740, e.g., based on the current loads on the SAS instances 735, 740. The domain proxy 710 then monitors the connection to determine whether the connection is working properly or if there is a possible failure or disruption or degradation of the connection. Some embodiments of the domain proxy 710 (or the base stations 705-708) monitor the connection by tracking latencies of messages exchanged over the connection or by monitoring the heartbeat messages exchanged with the SAS instances 735, 740. A possible failure of the connection is indicated by an increase in the message latency, e.g., a latency that exceeds a threshold value, or by a failure to receive a predetermined number of consecutive heartbeat messages.

The base stations 705-708 or the domain proxy 710 iteratively attempt to switch the connection to different ports 701-703 in response to detecting a possible failure of the connection. For example, if the domain proxy 710 (or any of the base stations 705-708) initially established the connection via the port 701 and the domain proxy 710 detects a possible failure of the connection, the domain proxy 710 switches the connection to the port 702 and begins monitoring the connection. If the monitoring indicates that the connection is working properly, the domain proxy 710 maintains the connection with the port 702. If the monitoring indicates a possible failure of the connection, the domain proxy 710 switches the connection to the port 703 and begins monitoring the connection. The iterative process continues until the domain proxy 710 detects a functional port 701-703 or the domain proxy 710 fails to detect a functional port after attempting to connect with all of the available ports 701-703. In that case, the domain proxy 710 releases the connection and attempts to establish a connection to a geo-redundant secondary SAS, if available. Timing of the iterative process is set so that the process completes before a timeout interval for exchanging heartbeat messages expires. For example, the iterative process should complete within 240-300 seconds to avoid having to shut down CBRS operation.

In some embodiments, elements in the communication system 700 are mirrored to maintain redundant connectivity within the communication system 700. For example, failure of the router 720 interrupts all paths to the SAS instances 735, 740. The router 720 is therefore mirrored (1+1) to maintain redundant connectivity to the Internet. For another example, the load-balancing elements 721-723 are mirrored to provide redundancy. If the load-balancing elements 721-723 are implemented in software, then the load-balancing elements 721-723 are mirrored (1+1). If the load-balancing elements 721-723 are implemented using a standalone appliance or device, the appliance or device should support (1+1) redundant configuration. For another example, failure of the SAS core 735, 740, the web front-ends 745, 750, and the SAS database 755 can be detected using an appropriate framework for performing restarts, failover, and recovery.

Figure 8:
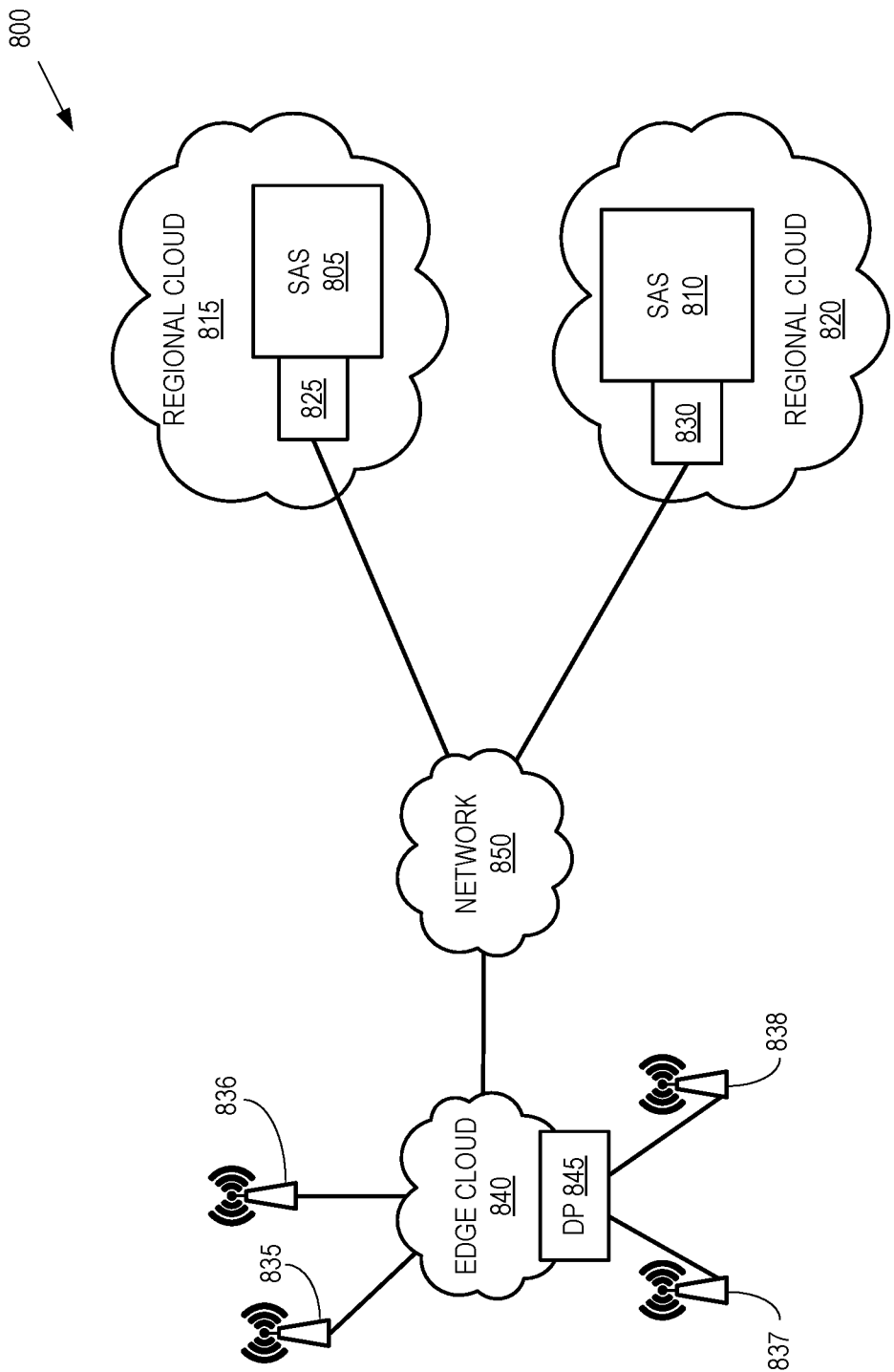
FIG. 8 is a block diagram of a communication system that implements primary and secondary SAS instances according to some embodiments.

FIG. 8 is a block diagram of a communication system 800 that implements primary and secondary SAS instances 805, 810 according to some embodiments. The primary and secondary SAS instances 805, 810 are implemented in corresponding geo-redundant regional clouds 815, 820. The primary and secondary SAS instances 805, 810 are accessed via corresponding ports 825, 830 using their IP addresses, as discussed herein. Although a single port 825, 830 is shown for each SAS instance 805, 810 in the interest of clarity, some embodiments of the SAS instances 805, 810 include multiple ports such as the ports 701-703 shown in FIG. 7.

The communication system 800 includes base stations 835, 836, 837, 838, which are collectively referred to herein as "the base stations 835-838." The base stations 835, 836 are connected to an edge cloud 840 such as the edge cloud 125 shown in FIG. 1. The base stations 835, 836 provide wireless connectivity within corresponding geographic areas or cells. The base stations 837, 838 are connected to a domain proxy 845 such as the domain proxy 130 shown in FIG. 1. The edge cloud 840 is connected to a network 850 such as the Internet, which interconnects the edge cloud 840 with the regional clouds 815, 820.

The base stations 835-838 register with one of the SAS instances 805, 810 as a primary SAS instance and use the other one of the SAS instances 805, 810 as a geo-redundant secondary SAS instance. In the illustrated embodiment, the domain proxy 845 (or one of the base stations 835-838) registers with the (primary) SAS instance 805 to establish an SAS service for providing wireless connectivity. The domain proxy 845 and the primary SAS instance 805 begin exchanging heartbeat messages and the domain proxy 845 monitors the connection via the port 825. As discussed herein, the domain proxy 845 iteratively attempts to maintain the connection via different ports to the SAS instance 805 in the event that the domain proxy 845 detects a possible failure of the connection via the port 825. If the domain proxy 845 is unable to locate a port to the SAS instance 805 that supports a functional connection, the domain proxy 845 releases the connection to the SAS instance 805 and reconnects to the secondary SAS instance 810, e.g., via the port 830. In some embodiments, the primary SAS instance 805 and the secondary SAS instance 810 share an SAS database such as the SAS database 755 shown in FIG. 7. In that case, identifiers in the heartbeat messages exchanged with the secondary SAS instance 810, e.g., identifiers of the base stations 835-838 or the domain proxy 845, are used to retrieve an existing record, which reduces the delay in establishing the new connection. Otherwise, the base station 835-838 or the domain proxy 845 are forced to re-register, which results in a longer delay in establishing the new connection.

Some embodiments of the set of co-located base stations 835-838 are configured so that they use different primary SAS instances to avoid downtime during switching between primary and secondary SAS instances. For example, the base stations 835 and 837 use SAS instance 805 as their primary SAS and SAS instance 810 as their secondary SAS. In contrast, the base stations 836 and 838 use SAS instance 810 as their primary SAS and SAS instance 805 as their secondary SAS. In a scenario where switching from primary SAS instance 805 to secondary SAS instance 810 is inevitable, which would result in service downtime, the impact will be on just a single base station in a given geographic coverage area. For example, the base stations 835 and 837 are impacted by the change from the primary SAS instance 805 to the secondary SAS instance 810 but the base stations 836 and 838 are not affected. User equipment that were attached to base stations 835 and 837 are handed over in a geographic overlapping coverage area to the base stations 836 and 838, respectively, without incurring a service downtime.

Figure 9:
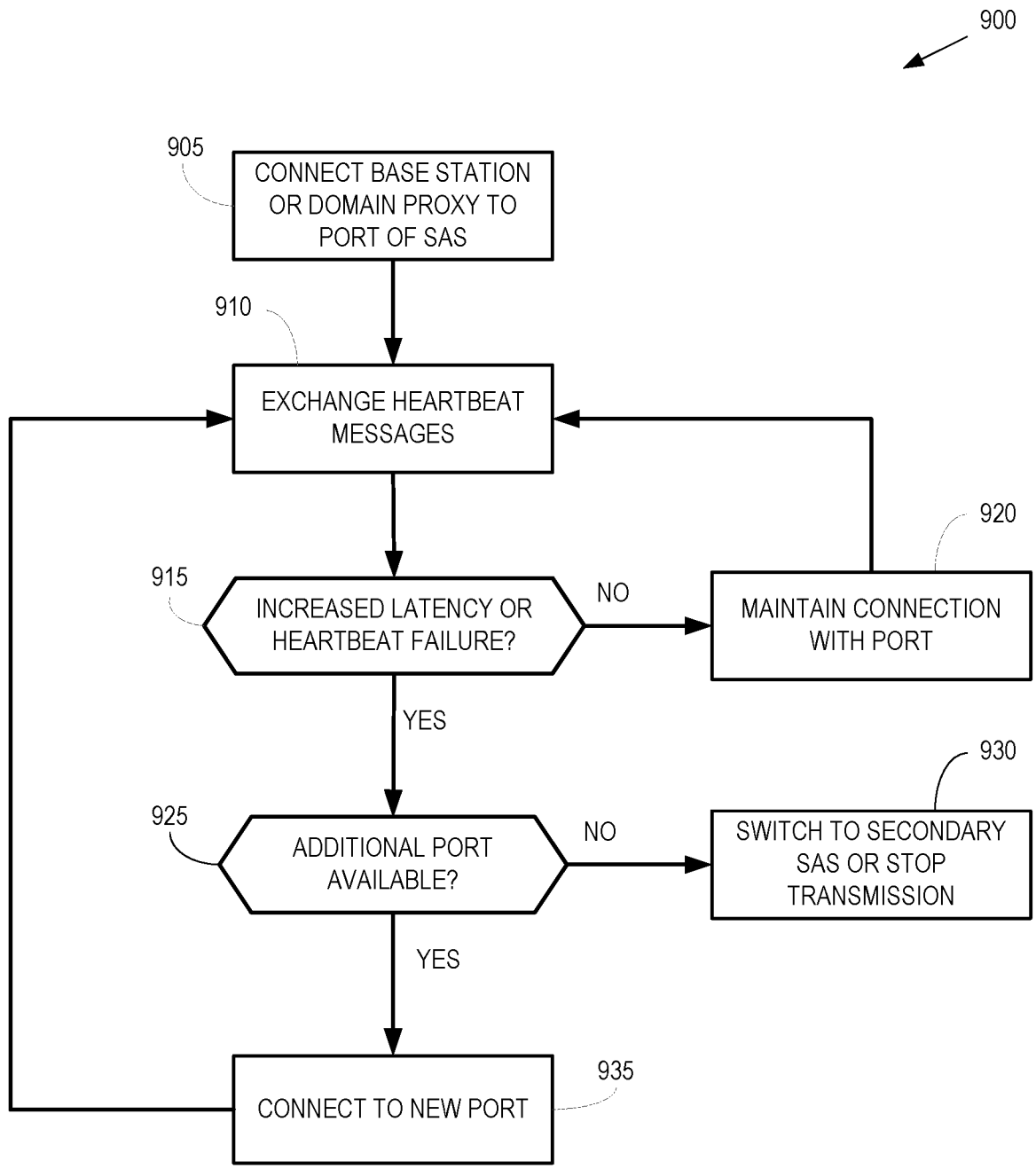
FIG. 9 is a flow diagram of a method of selectively attempting to switch a connection to different ports of an SAS according to some embodiments.

FIG. 9 is a flow diagram of a method 900 of selectively attempting to switch a connection to different ports of an SAS according to some embodiments. The method 900 is implemented in some embodiments of the communication system 100 shown in FIG. 1, the communication system 400 shown in FIG. 4, the communication system 500 shown in FIG. 5, the communication system 600 shown in FIG. 6, the communication system 700 shown in FIG. 7, and the communication system 800 shown in FIG. 8.

At block 905, a base station or domain proxy establishes a connection to a port of an SAS so that the base station or domain proxy is able to support wireless connectivity in the shared CBRS spectrum. In the illustrated embodiment, multiple ports provide access to the SAS and the multiple ports are accessed using different IP addresses. Establishing the connection to the port of the SAS includes registering the base station or the domain proxy to the SAS and negotiating a periodicity or time interval for exchanging heartbeat messages.

At block 910, the base station or domain proxy begins exchanging heartbeat messages with the SAS over the connection established via the port to the SAS. The heartbeat messages are exchanged at the negotiated periodicity. The base station or domain proxy also monitors the connection for indications of a possible failure such as a message latency increasing to more than a threshold latency or a failure to receive a predetermined number of consecutive heartbeat messages.

At decision block 915, the base station or domain proxy determines whether the monitoring has detected an indication of a possible failure. The indication includes an increased latency of messages transmitted over the connection, a consecutive number of failures of heartbeat messages, and the like. If no indication of a possible failure is detected, the method 900 flows to block 920 and the base station or domain proxy maintains the connection with the SAS via the port. The base station or domain proxy also continues exchanging heartbeat messages at block 910. If the base station or domain proxy detects an indication of a possible failure, the method 900 flows to decision block 925.

At decision block 925, the base station or domain proxy determines whether there is an additional port available to access the SAS. If not, the method 900 flows to block 930 and the base station or domain proxy switches to a secondary SAS or stops transmission if there is no secondary SAS available. If the base station or domain proxy determines that there is at least one additional port available to access the SAS, the method 900 flows to block 935.

At block 935, the base station or domain proxy switches the connection to the next available port, which is indicated by a different IP address than the current port. The method 900 then flows to block 910 and the base station or domain proxy begins exchanging heartbeat messages with the SAS via the new port. The base station or domain proxy also monitors the connection to detect indications of a possible failure. The method 900 therefore iterates through the available ports until the base station or domain proxy finds a functional port to access the SAS or determines that none of the available ports are able to provide a connection to the SAS.

Figure 10:
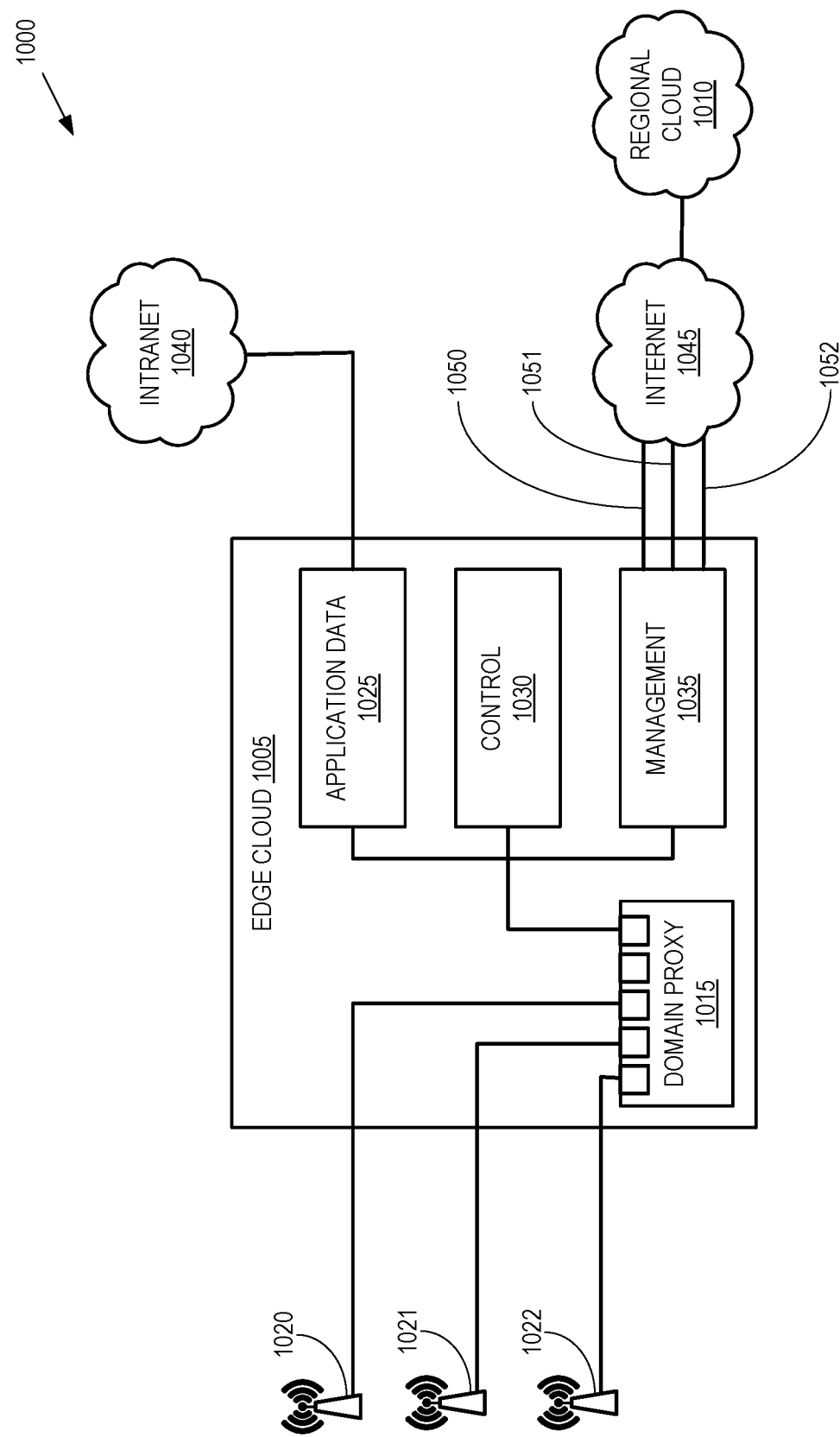
FIG. 10 is a block diagram of a communication system that includes redundant backhaul links between an edge cloud and a regional cloud according to some embodiments.

FIG. 10 is a block diagram of a communication system 1000 that includes redundant backhaul links between an edge cloud 1005 and a regional cloud 1010 according to some embodiments. The edge cloud 1005 includes a domain proxy 1015 that is connected to the base stations 1020, 1021, 1022, which are collectively referred to herein as "the base stations 1020-1022." In the illustrated embodiment, domain proxy 1015 resides in the edge cloud 1005 and connects the base stations 1020-1022 to an application data block 1025, a control block 1030, and a management block 1035. The application data block 1025 connects the edge cloud 1005 to a customer intranet 1040. The control block 1030 performs control operations for the edge cloud 1005. The management block 1035 manages the connections between the edge cloud 1005 and the regional cloud 1010.

The edge cloud 1005 is connected to a network 1045 (such as the Internet) via a set of redundant backhaul links 1050, 1051, 1052, which are collectively referred to herein as "the backhaul links 1050-1052." In the illustrated embodiment, the backhaul link 1050 is implemented as a satellite backhaul, the backhaul link 1051 is implemented as a fiber backhaul, and the backhaul link 1052 is implemented using a dial-up modem. However, other types of backhaul links are used to implement the backhaul links 1050-1052 in other embodiments. Furthermore, more or fewer redundant backhaul links are implemented in some embodiments of the communication system 1000. The backhaul capacity or bandwidth that is needed to support some embodiments of the redundant backhaul links 1050-1052 for different access time intervals is shown in Table 1.

TABLE 1

| # of CBSDs | Backhaul Bandwidth (1 second access) | Backhaul Bandwidth (10 second access) |
|---|---|---|
| 50 | 0.8 Mbps | 0.08 Mbps |
| 500 | 8 Mbps | 0.8 Mbps |
| 5000 | 80 Mbps | 8 Mbps |

The domain proxy 1015 stores information identifying the backhaul link that is currently being used to support the connection between the base stations 1020-1022 and an SAS instance implemented in the regional cloud 1010. The domain proxy 1015 also monitors the connection to detect indications of a possible failure such as increased message latency or failure to receive a predetermined number of consecutive heartbeat messages. If the domain proxy 1015 detects a possible failure (and, in cases where the SAS includes multiple ports, the domain proxy 1015 is unable to locate a functional port), the domain proxy 1015 iteratively connects to the different backhaul links 1050-1052 and monitors each link to determine whether the connection is successfully established. If the domain proxy 1015 finds a functional backhaul link, the connection proceeds via the functional backhaul link. Otherwise, the domain proxy 1015 can revert to a local SAS instance or act as an SAS proxy to maintain the connection so that the base stations 1020-1022 continue to provide connectivity in the shared CBRS spectrum. The domain proxy 1015 can also raise appropriate alarms for remedial actions within the communication system 1000.

In the case that the domain proxy 1015 reverts to a local SAS instance, the local SAS instance is un-advertised and only peers with SAS instances that are advertised by the same vendor, e.g., SAS instance 805 and SAS instance 810 in FIG. 8, using periodic SAS-to-SAS information exchange. The local SAS instance does not peer with SAS instances associated with other vendors. The advertised SAS instances 805 and 810 peer with other vendor SAS instances via periodic SAS-To-SAS information exchange. The local SAS therefore receives all the updated deployment information for CBSDs in the immediate vicinity that are managed by SAS instances associated with other vendors. The local SAS is available in deployment scenarios that are far away from a DPA or a coastal region, such as locations in the Midwest on wind farms or in mines that are far away from any incumbents. In these circumstances, the local SAS instance keeps the CBRS RAN operational with the current PAL protection area enforcement (if defined) till the backhaul connectivity to the regional cloud 1010 is restored. The domain proxy 1015 then reverts back the operations from the local SAS to the regional cloud SAS instances without any impact to any incumbents or to the CBSD operation. The CBSDs do not notice any switch in SAS instances, as it established a primary and secondary SAS link via the domain proxy 1015, which also serves as an aggregator for multiple CBSD. The domain proxy 1015 therefore seamlessly performs switching of SAS hosted on regional cloud to the local SAS.

Figure 11:
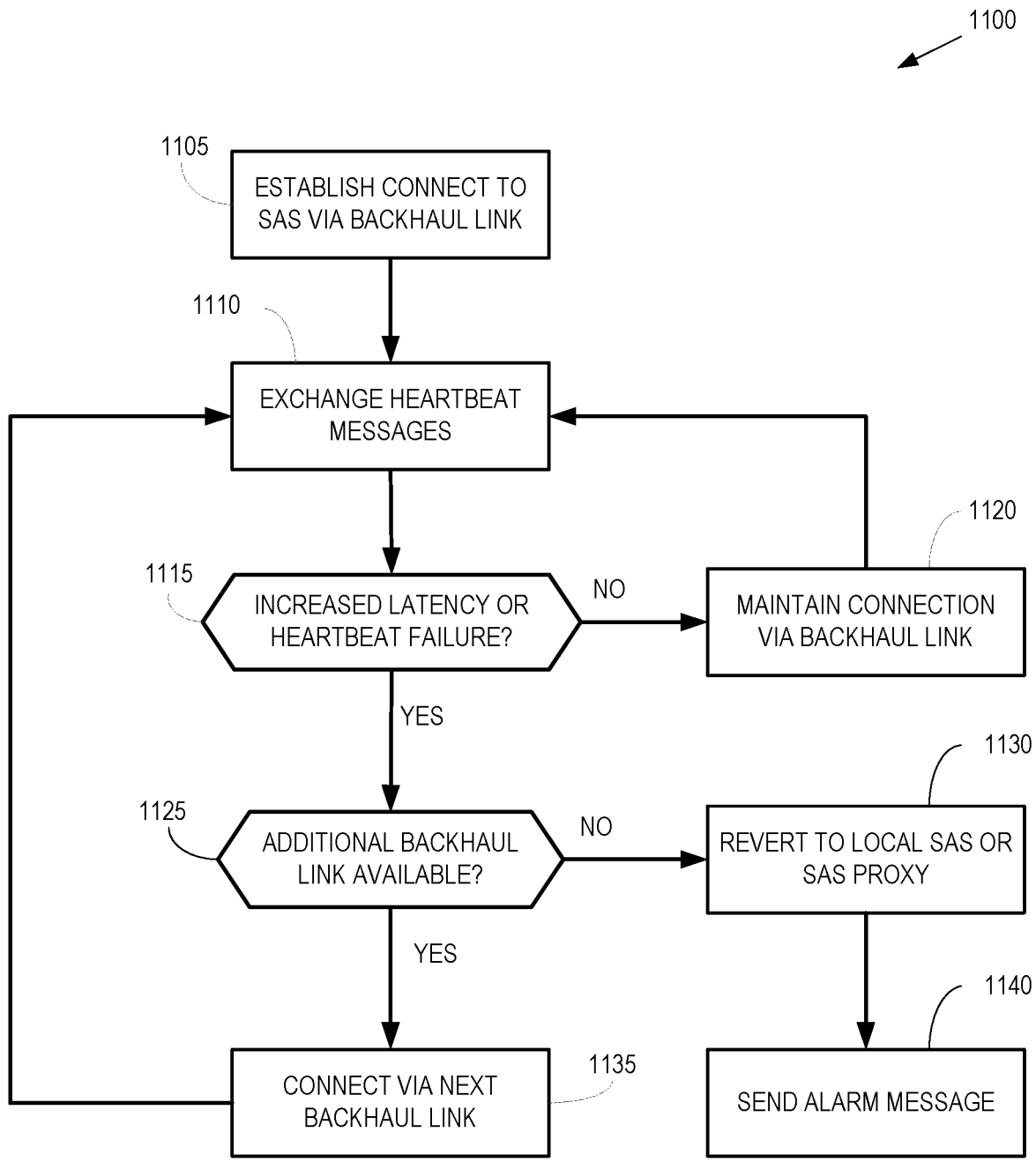
FIG. 11 is a flow diagram of a method of selectively attempting to switch a connection to different backhaul links to an SAS according to some embodiments.

FIG. 11 is a flow diagram of a method 1100 of selectively attempting to switch a connection to different backhaul links to an SAS according to some embodiments. The method 1100 is implemented in some embodiments of the communication system 100 shown in FIG. 1, the communication system 400 shown in FIG. 4, the communication system 500 shown in FIG. 5, the communication system 600 shown in FIG. 6, the communication system 700 shown in FIG. 7, the communication system 800 shown in FIG. 8, and the communication system 1000 shown in FIG. 10.

At block 1105, a base station or domain proxy establishes a connection to an SAS via a backhaul link so that the base station or domain proxy is able to support wireless connectivity in the shared CBRS spectrum. In the illustrated embodiment, multiple redundant backhaul links are available to support connections between the base station or domain proxy and the SAS, e.g., the backhaul links 1050-1052 shown in FIG. 10. Establishing the connection to the SAS includes registering the base station or the domain proxy to the SAS and negotiating a periodicity or time interval for exchanging heartbeat messages.

At block 1110, the base station or domain proxy begins exchanging heartbeat messages with the SAS over the connection established via the backhaul link.

The heartbeat messages are exchanged at the negotiated periodicity. The base station or domain proxy also monitors the connection for indications of a possible failure such as increase message latency or a failure to receive consecutive heartbeat messages.

At decision block 1115, the base station or domain proxy determines whether the monitoring has detected an indication of a possible failure. The indication includes an increased latency of messages transmitted over the connection, a consecutive number of failures of heartbeat messages, and the like. If no indication of a possible failure is detected, the method 1100 flows to block 1120 and the base station or domain proxy maintains the connection with the SAS via the backhaul link. The base station or domain proxy also continues exchanging heartbeat messages at block 1110. If the base station or domain proxy detects an indication of a possible failure, the method 1100 flows to decision block 1125.

At decision block 1125, the base station or domain proxy determines whether there is an additional redundant backhaul link to the SAS. If not, the method 1100 flows to block 1130. If the base station or domain proxy determines that there is at least one additional backhaul link available to the SAS, the method 1100 flows to block 1135.

At block 1130, the base station or domain proxy reverts to a local SAS instance or instantiates an SAS proxy so that the connection is maintained even though the original SAS is inaccessible. The method 1100 then flows to block 1140 and the base station or domain proxy sends one more alert messages to alert the system to the potential failure of the available backhaul links.

At block 1135, the base station or domain proxy switches the connection to the next available backhaul link. The method 1100 then flows to block 1110 and the base station or domain proxy begins exchanging heartbeat messages with the SAS via the new backhaul link. The base station or domain proxy also monitors the connection to detect indications of a possible failure. The method 1100 therefore iterates through the available ports until the base station or domain proxy finds a functional backhaul link to access the SAS or determines that none of the available backhaul links are able to provide a connection to the SAS. If one of the backhaul links is restored, the domain proxy will revert the operation from the local SAS instance to the geo-redundant SAS instance.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectro-mechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
a) hardware-only circuit implementations (such as implementations and only analog and/or digital circuitry) and
b) combinations of hardware circuits and software, such as (as applicable):
   (i) a combination of analog and/or digital hardware circuit(s) with software/firmware and
   (ii) any portions of a hardware processor(s) with software (including digital signal processor(s), software, and memory(ies) that work together to cause an apparatus, such as a mobile phone or server, to perform various functions) and
c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
    a transceiver configured to establish a connection with a spectrum access server (SAS) in a Citizen's Broadband Radio System (CBRS) shared spectrum; and
    a processor configured to monitor a status of the connection and modify the connection to one of an available port and an available backhaul link in the SAS in response to the status indicating a possible failure of the connection, wherein modifying the connection is performed prior to expiration of a timeout interval for the connection to the SAS;
    wherein the processor is further configured to switch connectivity to a secondary, geo-redundant SAS in response to failing to locate a corresponding one of a functional port and backhaul link among the corresponding available ports and backhaul links of the SAS.

2. The apparatus of claim 1, wherein the transceiver is configured to exchange heartbeat messages with the SAS at a predetermined periodicity.

3. The apparatus of claim 1, wherein the processor is configured to determine the status of the connection by monitoring at least one of a message latency over the connection and a number of consecutive failures of the heartbeat messages exchanged with the SAS.

4. The apparatus of claim 1, wherein the transceiver is configured to establish the connection with a first port of the SAS, and wherein the processor is configured to modify the connection by switching the connection from the first port to a second port of the SAS.

5. The apparatus of claim 4, wherein the processor is configured to:
    monitor the status of the connection with the second port of the SAS and switch the connection from the second port to a third port of the SAS in response to the status indicating a possible failure of the connection with the second port;
    iteratively monitor the status of the connection with different ports of the SAS and switch the connection to another available port of the SAS until a functional port is located or until all available ports of the SAS have been attempted;
iteratively monitor the status of the connection with all available ports of the SAS prior to expiration of the timeout interval for the connection to the SAS.

6. The apparatus of claim 1, wherein the transceiver is configured to establish the connection with the SAS via a first backhaul link and wherein the processor is configured to modify the connection by switching the connection from the first backhaul link to a second backhaul link.

7. The apparatus of claim 1, wherein the processor is configured to iteratively monitor the status of the connection to the SAS via different backhaul links and switch the connection to another available backhaul link until a functional backhaul link is located or until all available backhaul links to the SAS have been attempted.

8. The apparatus of claim 7, wherein the processor is configured to switch connectivity to at least one of a local instance of an SAS or an SAS proxy in response to the processor failing to locate a functional backhaul link.

9. A method comprising:
establishing, at a network entity that supports wireless connectivity, a connection with a spectrum access server (SAS) in a Citizen's Broadband Radio System (CBRS) shared spectrum;
monitoring, at the network entity, a status of the connection; and
modifying, at the network entity, the connection via an available backhaul link in the SAS in response to the status indicating a possible failure of the connection, wherein modifying the connection is performed prior to expiration of a timeout interval for the connection to the SAS; and wherein modifying the connection comprises switching the connection to a secondary, geo-redundant SAS in response to failing to locate a functional backhaul link among the available backhaul links of the SAS.

10. The method of claim 9, further comprising:
exchanging heartbeat messages between the network entity and the SAS at a predetermined periodicity.

11. The method of claim 10, wherein monitoring the status of the connection comprises monitoring at least one of a message latency over the connection and a number of consecutive failures of the heartbeat messages exchanged with the SAS.

12. The method of claim 9, wherein iteratively monitoring the status of the connection comprises iteratively monitoring the status of the connection with all available backhaul link of the SAS prior to expiration of the timeout interval for the connection to the SAS.

13. The method of claim 9, wherein establishing the connection comprises establishing the connection with the SAS via a first backhaul link, and wherein modifying the connection comprises switching the connection from the first backhaul link to a second backhaul link.

14. The method of claim 13, further comprising:
iteratively monitoring the status of the connection to the SAS via different backhaul links; and
switching the connection to another available backhaul link until a functional backhaul link is located or until all available backhaul links to the SAS have been attempted.

15. An apparatus comprising:
at least one processor; and
at least one memory including computer program code;
the at least one memory and the computer program code configured to, with the at least one processor, cause the apparatus at least to perform:
establishing a connection with a spectrum access server (SAS) in a Citizen's Broadband Radio System (CBRS) shared spectrum;
monitoring a status of the connection; and
modifying the connection to an available port in the SAS in response to the status indicating a possible failure of the connection, wherein modifying the connection is performed prior to expiration of a timeout interval for the connection to the SAS;
wherein the processor is further configured to switch connectivity to a secondary, geo-redundant SAS in response to failing to locate a functional port among the available ports of the SAS.

* * * * *